United States Patent

[11] 3,610,424

[72] Inventor Maxwell H. Connan
Glen Head, N.Y.
[21] Appl. No. 32,590
[22] Filed Apr. 28, 1970
[45] Patented Oct. 5, 1971
[73] Assignee The Conart Co., Inc.
Glen Head, N.Y.

[54] CASSETTE HOLDER
2 Claims, 3 Drawing Figs.

[52] U.S. Cl. .......... 211/40
[51] Int. Cl. .......... A47g 29/00
[50] Field of Search .......... 211/40, 131, 41, 163, 90, 42; 312/97.1, 11

[56] References Cited

UNITED STATES PATENTS

| | | | |
|---|---|---|---|
| 3,092,256 | 6/1963 | Vernik | 211/40 |
| 3,161,294 | 12/1964 | Meuche | 211/41 |
| 3,221,890 | 12/1965 | Wassell | 211/131 X |
| 3,297,372 | 1/1967 | Brader | 211/163 X |
| 3,334,950 | 8/1967 | Brownlee | 312/97.1 X |
| 3,452,878 | 7/1969 | Smith | 211/41 |

*Primary Examiner*—Nile C. Byers, Jr.
*Attorney*—Charles E. Temko

ABSTRACT: A device for the retreivalbe storage of individual tape cassettes including a plurality of first members in juxtaposed relation and defining a plurality of slots therebetween corresponding in width to that of an individual cassette, a second member abutting the inner end of each of said plurality of first members, and defining therewith a tapered slot corresponding generally in width to an enlargement on said cassettes, whereby a cassette may be inserted endwise within one of said plurality of slots in such manner that the enlargement thereon becomes wedged within said tapered slot.

CASSETTE HOLDER

This invention relates generally to the field of audio tape storage, and more particularly to an improved means for storing in readily retreivable fashion a plurality of tape cassettes.

Tape cassettes of the so-called "Norelco" type are now widely used as a recording medium at a consumer level, and are available in both prerecorded and unrecorded types. These cassettes are characterized by simplicity of construction and assembly, and include two identical castings which are assembled together to maintain the internally moving parts thereof, the castings forming an opening along one side edge through which a continuous segment of tape is exposed. The opening is bordered by an enlargement of elongated trapezoidal configuration, which extends laterally from the plane of the cassette on each side approximately one sixteenth of an inch. Centrally located on the sides of the cassette is indicia means in the form of a label or blank paper, upon which an indicia may be placed. It is desirable during storage that the label or indicia be exposed to view, so that the cassette may be readily identified prior to removal from the storage device.

Existing prior art devices for storing cassettes of this type have normally been of box-type configuration, provided with a lid which when opened exposes a plurality of rectangularly shaped compartments into which individual cassettes may be placed. In certain types, provision is made for the writing of an indicia on that portion of the lid which immediately overlies the compartment when the lid is closed so that the identification of the cassette may be made without the necessity of removing it from the compartment. However, such devices do not permit ready retreival of the cassette from the compartment, and require a notation on the lid for purposes of identification. Such devices must normally be formed in such manner that the compartments are lined with a soft material, in order to positively hold the cassette, and eliminate rattling with accompanying noise. Because of the lack of an opening whereby the cassette may be conveniently grasped, it is usually necessary to tilt the holder and allow the force of gravity to permit the desired cassette to slide from the compartment. Very often other cassettes, which are undesired at the moment, execute a similar movement. Because of the structural requirements of such devices, the cost of manufacture has been relatively high.

It is therefore among the principal objects of the present invention to provide an improved tape cassette storage device in which the above-mentioned disadvantages have been substantially eliminated.

Another object of the invention lies in the provision of an improved tape storage device which will conveniently store individual tape cassettes in such manner that the indicia normally present on the outer planar surfaces thereof may be readily viewed by a user without the necessity of moving the cassette with respect to the device.

Yet another object of the invention lies in the provision of an improved tape cassette storage device into which cassettes may be readily inserted and removed as required with a minimum of manipulation.

Still another object of the invention lies in the provision of an improved device of the class described, in which the cost of fabrication may be of a reasonably low order, considerably lower than that of existing prior art devices, with consequent wide sale, distribution and use.

A feature of the disclosed embodiment lies in the fact that it may be conveniently integrally molded from synthetic resinous materials.

Another feature of the disclosed embodiment lies in the unusually attractive appearance of the same.

In the drawing, to which reference will be made in the specification, similar reference characters have been employed to designate corresponding arts throughout the several views.

Figure 1:
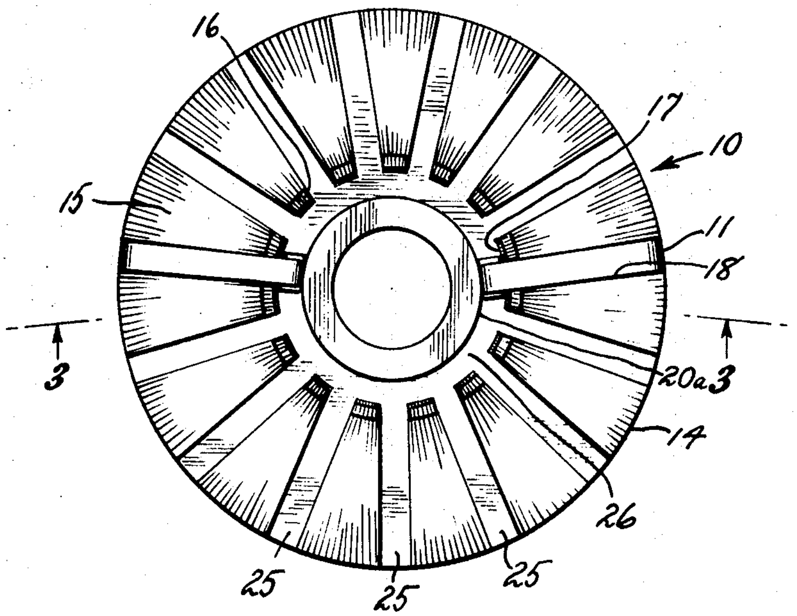
FIG. 1 is a top plan view of an embodiment of the invention.
Figure 2:
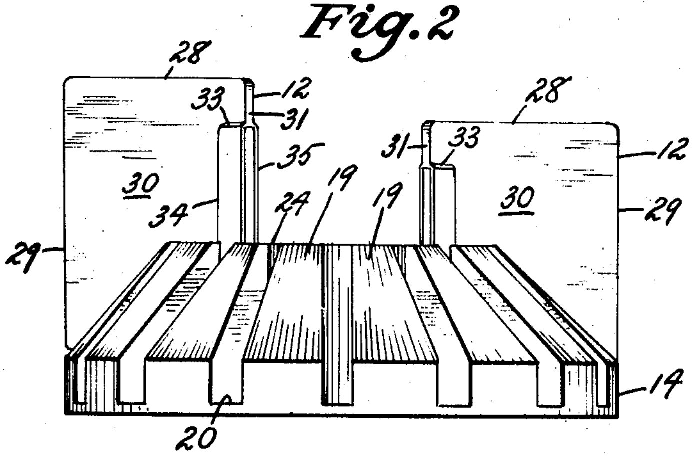
FIG. 2 is a side elevational view thereof.
Figure 3:
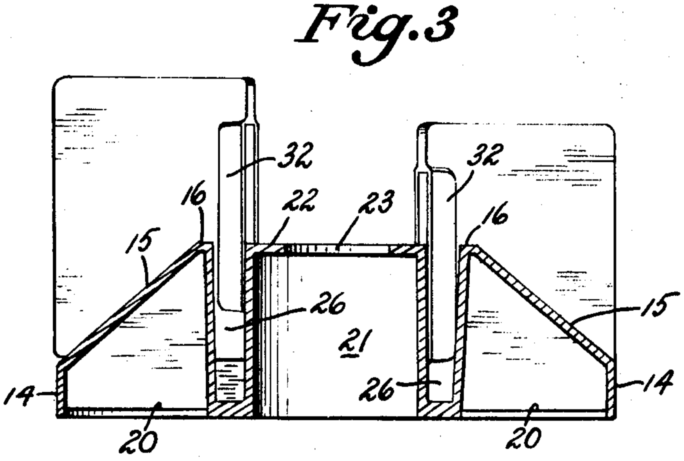

FIG. 3 is a vertical sectional view, as seen from the plane 3–3 in FIG. 1. In accordance with the invention, the device, generally indicated by reference character 10, comprises; an integrally molded body element 11 used in conjunction with a conventional cassette 12.

The body element 11, as has been mentioned, is preferably formed from synthetic resinous materials as a result of injection molding, and is bounded by an outer cylindrical wall 14, a segmented conical wall 15, a segmented top wall 16 and a segmented inner wall 17. The walls 14–17, inclusive, are interconnected by radially extending walls 18 to form a plurality of generally trapezoidally shaped outer members 19. The radially extending walls 18 are interconnected by a lower wall 20 which extends radially inwardly to an inner circular edge **20*a***.

Extending upwardly from the edge **20*a* is an inner cylindrical wall 21 in turn communicating with a centrally disposed upper wall 22 having a central opening 23 which permits the device to manually grasped without the necessity of disturbing individual cassettes engaged therewith. The cylindrical wall 21 and upper wall 22 constitute a centrally disposed cylindrical member 24 which abuts the inner surfaces of each of the outer members 19, so that there are defined therebetween a plurality of radial slots 25 corresponding in width to that of individual cassettes 12, and an arcuate slot 26. Unlike the radial slots 25 which are of uniform width throughout, the slot 26 is arcuate in shape, and is tapered from top to bottom in a downwardly direction so that the upper portion thereof is of slightly greater width than the corresponding part of the cassette 12** which is engaged, and the lower part is of slightly lesser width than the same part.

The cassette 12, being of well-known configuration, need be described only briefly in his disclosure. It is bounded by a pair of edge surfaces 28, outer side surfaces 29, planar surfaces 30 and inner side surfaces 31. The inner side surfaces 31 are modified to form a plurality of elongated enlargements 32 which extend laterally with respect to the principal plane of the cassette, each enlargement including a pair of converging edges 33, an inner edge 34, and an outer 35. The width of each enlargement, as measured between the inner and outer edges 34–35, respectively, is standardized, and is substantially the median width of the slots 26.

Insertion and removal of an individual cassette 12 with respect to the device 10 is simply a matter of positioning the cassette above the device such that a plane of the cassette is aligned with that of a radial slot 25, so that with a downward movement, the slot 25 will engage the body of the cassette, and the arcuate slot 26 will engage the enlargements 32 on either side thereof, as seen in FIG. 3. With progressive downward movement, the engagement is no longer a sliding fit, and the projections become wedged between the inner cylindrical wall 21 and the corresponding inner wall 17. In this condition, owing to the inherent resiliency of the material from which the device is manufactured, a slight degree of distortion occurs with a corresponding resilient stress exerted against the enlargements 32. To remove a cassette requires only an upward movement sufficient to disengage the wedging effect described above. It will be observed that owing to the presence of the conical wall 15, the indicia normally present on the cassette is readily viewable on both sides thereof without the necessity of previously removing the cassette.

I wish it to be understood that I do not consider the invention limited to the precise details of structure shown and set forth in this specification, for obvious modifications will occur to hose skilled in the art to which the invention pertains.

I claim:

1. A device for storing tape cassettes of a type having a generally rectangular planar configuration and having a projection thereon extending laterally with respect to the plane thereof, said projection having a predetermined width as measured in a plane parallel to said last-mentioned plane, said device comprising: a plurality of first members in juxtaposed spaced relation and defining a first slot corresponding in width to that of a cassette, and a second member disposed in spaced relation with respect to one end of each of said juxtaposed first members to define a second slot therewith of width substantially equal to said predetermined width of said projection; said second slot being of tapered configuration, whereby a cassette may be inserted into said first and second slots in such manner that said cassette is retained by the engagement of said projection with a surface of at least one of said first members defining said second slot, said second slot tending to exert a wedging action thereupon.

2. Structure in accordance with claim 1, in which said device is formed as a result of a molding operation from synthetic resinous resilient materials, whereby wall surfaces defining said second slots may have a degree of resilience permitting a limited degree of distortion upon the occurrence of said wedging action.